(12) United States Patent
Baid et al.

(10) Patent No.: US 11,522,951 B2
(45) Date of Patent: Dec. 6, 2022

(54) CONFIGURING SERVICE MESH NETWORKING RESOURCES FOR DYNAMICALLY DISCOVERED PEERS OR NETWORK FUNCTIONS

(71) Applicant: Microsoft Technology Licensing, LLC, Redmond, WA (US)

(72) Inventors: Akash Baid, Boston, MA (US); Nitish Malhotra, Billerica, MA (US); Michael Anthony Brown, McKinney, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 17/006,286

(22) Filed: Aug. 28, 2020

(65) Prior Publication Data
US 2022/0070250 A1 Mar. 3, 2022

(51) Int. Cl.
*H04L 67/104* (2022.01)
*G06F 16/23* (2019.01)
*H04W 84/18* (2009.01)

(52) U.S. Cl.
CPC ........ *H04L 67/104* (2013.01); *G06F 16/2379* (2019.01); *H04W 84/18* (2013.01)

(58) Field of Classification Search
CPC ... H04L 67/104; G06F 16/2379; H04W 84/18
See application file for complete search history.

(56) References Cited

U.S. PATENT DOCUMENTS

| | | | |
|---|---|---|---|
| 2020/0052982 A1 | 2/2020 | Nainar et al. | |
| 2021/0352139 A1* | 11/2021 | Madisetti | H04L 9/3239 |
| 2022/0012045 A1* | 1/2022 | Rudraraju | G06F 8/60 |
| 2022/0019455 A1* | 1/2022 | Cao | G06F 9/45545 |

FOREIGN PATENT DOCUMENTS

WO 2019204199 A1 10/2019

OTHER PUBLICATIONS

"5G Network Architecture A High-Level Perspective", In White Paper of HUAWEI, Apr. 15, 2020, 21 Pages.
"Application-oriented 5G Core Network Service Architecture", Retrieved from: https://sdnfv.zte.com.cn/en/insights/2019/8/Application-oriented-5G-Core-Network-Service-Architecture, Aug. 15, 2019, 2 Pages.
"Architecture", Retrieved from: https://istio.io/latest/docs/ops/deployment/architecture/, Retrieved Date: Jun. 15, 2020, 3 Pages.
"AWS App Mesh", Retrieved from: https://web.archive.org/web/20200317030212/https:/docs.aws.amazon.com/app-mesh/latest/userguide/app-mesh-ug-pdf, Mar. 17, 2020, 83 Pages.
(Continued)

*Primary Examiner* — Kristie D Shingles
(74) *Attorney, Agent, or Firm* — Ray Quinney & Nebeker P.C; James Bullough

(57) ABSTRACT

The present disclosure relates to methods and systems for configuring service mesh networking resources for dynamically discovered external entities. The methods and systems create custom resource objects for services provided by the external entities and dynamically create service mesh network resources for the custom resource objects. The methods and systems enable communications with the external entities using the service mesh network resources.

18 Claims, 8 Drawing Sheets

(56) References Cited

OTHER PUBLICATIONS

"Cloud-Native Network Functions", In Whitepaper of CISCO, Jun. 13, 2020, 16 Pages.
"Service Mesh", Retrieved from: https://web.archive.org/web/20191005011747/https://www.envoyproxy.io/learn/service-mesh, Oct. 5, 2019, 5 Pages.
"Service Mesh", Retrieved from: https://access.redhat.com/documentation/en-us/openshift_container_platform/4.2/html-single/service_mesh/index, Retrieved Date: Jun. 15, 2020, 119 Pages.
"What is a service mesh?", Retrieved from: https://web.archive.org/web/20200514152929/https://www.vmware.com/topics/glossary/content/service-mesh. May 14, 2020, 3 Pages.
Bruner, Karen, "Chart a Course for a Service Mesh Future: Lifting Off with Istio", Retrieved from: https://thenewstack.io/chart-a-course-for-a-service-mesh-future-lifting-off-with-istio/, Sep. 24, 2019, 15 Pages.
Bruner, Karen, "Getting started with Istio Service Mesh—What is it and what does it do?", Retrieved from: https://www.stackrox.com/post/2019/06/getting-started-with-istio-service-mesh-what-is-it-and-what-does-it-do/, Jun. 20, 2019 3 Pages.
Liu, et al., "Implementation of NRF in the Docker-based NFV platform", In the Journal of Engineering, Mar. 2019, pp. 1-4.
Kumara, et al., "Software-Defined Service Networking: Performance Differentiation in Shared Multi-Tenant Cloud Applications", In IEEE Transactions on Services Computing, vol. 10, Issue 1, Jul. 26, 2016, pp. 9-22.
Larsson, Magnus, "Chapter 18—Using a Service Mesh to Improve Observability and Management", In Hands-On Microservices with Spring Boot and Spring Cloud, Sep. 20, 2019, pp. 492-550.
"International Search Report and Written Opinion Issued in PCT Application No. PCT/US21/034124", dated Aug. 6, 2021, 14 Pages.

\* cited by examiner

CONFIGURING SERVICE MESH NETWORKING RESOURCES FOR DYNAMICALLY DISCOVERED PEERS OR NETWORK FUNCTIONS

CROSS-REFERENCE TO RELATED APPLICATIONS

N/A

BACKGROUND

Service meshes require complex set of networking configuration resources to be deployed to enable traffic routing to external entities, such as, peer network functions (NFs) or external databases and servers. Previously, each different application had to implement many of the communication features and had to know, for example, how to encrypt traffic, decrypt traffic, and/or perform packet captures. Thus, when problems occurred in the communications, difficulties arose in troubleshooting the issues since different applications were implementing different procedures for the communications.

SUMMARY

In accordance with one aspect of the present disclosure, a system is disclosed that includes one or more processors, memory in electronic communication with the one or more processors, a data store, and instructions stored in the memory. The instructions are executable by the one or more processors to receive a request, at a service mesh network, from a consumer entity to register with an external entity that provides a service. The service is newly discovered by the consumer entity using a network repository function in a 5G network. The instructions are also executable by the one or more processors to create a record in the datastore for the service to maintain an association of the consumer entity using the service. The instructions are also executable by the one or more processors to create, in response to receiving the request from the consumer entity, a custom resource object for the service provided by the external entity. The custom resource object includes custom resource definitions that define characteristics of the service and routing requirements for communications with the service. The instructions are also executable by the one or more processors to provide the custom resource object to a Kubernetes control plane that manages network resources of the service mesh network and instruct the Kubernetes control plane to dynamically create one or more service mesh network resources for the custom resource object and configure the one or more service mesh network resources using the custom resource definitions. The instructions are executable by the one or more processors to enable communications from the consumer entity to access the service provided by the external entity by using the one or more service mesh network resources.

The instructions may be further executable by the one or more processors to monitor the custom resource object and perform one or more actions relating to the one or more service mesh network resources in response to a change of the custom resource object. The change may include one or more of a creation, a modification, or a deletion.

The instructions may be further executable by the one or more processors to delete the one or more service mesh network resources for the custom resource object in response to the deletion of the custom resource object. The communications between the consumer entity and the external entity may not be enabled in response to the one or more service mesh network resources being deleted.

The service may be previously unknown to the service mesh prior to receiving the request from the consumer entity.

The instructions may be further executable by the one or more processors to update the record in the data store for the service with the custom resource object and increase a reference count for the custom resource object by one. The reference count may be used to identify the association with the consumer entity using the service.

The instructions may be further executable by the one or more processors to receive a second request from a second consumer entity to register with the service provided by the external entity, determine that the record for the service exists in the data store, and increase the reference count for the custom resource object in the data store by one and update the association to the service to include the second consumer entity.

The instructions may be further executable by the one or more processors to enable the second consumer entity access to the service by using the one or more service mesh network resources for the custom resource object for the service.

The service mesh network resources may include one or more of service entries, virtual services, destination rules, route rules, gateways, or quotas.

The custom resource definitions may be created specifically for the service.

In accordance with another aspect of the present disclosure, a method is disclosed that includes receiving a request, at a service mesh network, from a consumer entity to register with an external entity that provides a service. The service is newly discovered by the consumer entity using a network repository function in a 5G network. The method also includes creating a record in a datastore for the service to maintain an association of the consumer entity using the service. The method also includes creating, in response to receiving the request from the consumer entity, a custom resource object for the service provided by the external entity. The custom resource object includes custom resource definitions that define characteristics of the service and routing requirements for communications with the service. The method also includes providing the custom resource object to a Kubernetes control plane that manages network resources of the service mesh network and instructs the Kubernetes control plane to dynamically create one or more service mesh network resources for the custom resource object and configuring the one or more service mesh network resources using the custom resource definitions. The method also includes enabling communications from the consumer entity to access the service provided by the external entity by using the one or more service mesh network resources.

The method may also include monitoring the custom resource object and performing one or more actions relating to the one or more service mesh network resources in response to a change of the custom resource object. The change may include one or more of a creation, a modification, or a deletion.

The method may further include deleting the one or more service mesh network resources for the custom resource object in response to the deletion of the custom resource object. The communications between the consumer entity and the external entity may not be enabled in response to the one or more service mesh network resources being deleted.

The service may be previously unknown to the service mesh prior to receiving the request from the consumer entity.

The method may further include updating the record in a data store for the service with the custom resource object and increasing a reference count for the custom resource object by one. The reference count may be used to identify the association with the consumer entity using the service.

The method may further include receiving a second request from a second consumer entity to register with the service provided by the external entity, determining that the record for the service exists in the data store, and increasing the reference count for the custom resource object in the data store by one and updating the association to the service to include the second consumer entity.

The method may further include enabling the second consumer entity access to the service by using the one or more service mesh network resources for the custom resource object for the service.

The service mesh network resources may include one or more of service entries, virtual services, destination rules, route rules, gateways, or quotas.

The custom resource definitions may be created specifically for the service.

In accordance with another aspect of the present disclosure, a computer-readable medium is disclosed that stores instructions executable by a computer device. The instructions include at least one instruction for causing the computer device to receive a request, at a service mesh network, from a consumer entity to register with an external entity that provides a service. The service is newly discovered by the consumer entity using a network repository function in a 5G network. The instructions also include at least one instruction for causing the computer device to create a record in a datastore for the service to maintain an association of the consumer entity using the service. The instructions also include at least one instruction for causing the computer device to create, in response to receiving the request from the consumer entity, a custom resource object for the service provided by the external entity. The custom resource object includes custom resource definitions that define characteristics of the service and routing requirements for communications with the service. The instructions also include at least one instruction for causing the computer device to provide the custom resource object to a Kubernetes control plane that manages network resources of the service mesh network and instruct the Kubernetes control plane to dynamically create one or more service mesh network resources for the custom resource object and configure the one or more service mesh network resources using the custom resource definitions. The instructions also include at least one instruction for causing the computer device to enable communications from the consumer entity to access the service provided by the external entity using the one or more service mesh network resources.

The computer-readable medium may also include at least one instruction for causing the computer device to monitor the custom resource object and at least one instruction for causing the computer device to perform one or more actions relating to the one or more service mesh network resources in response to a change of the custom resource object. The change may include one or more of a creation, a modification, or a deletion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
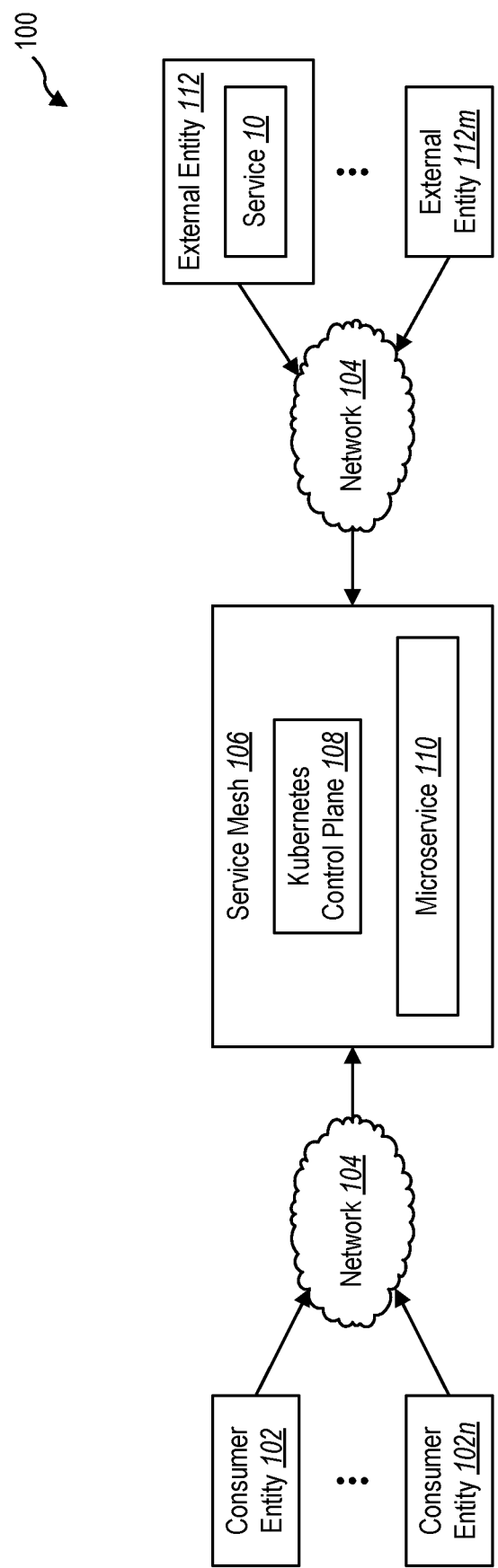
FIG. 1 illustrates an example system using a service mesh for communications with external entities in accordance with an implementation of the present disclosure.

This disclosure relates generally to using service meshes for facilitating communications. A service mesh is a dedicated infrastructure layer for handling service-to-service communication. Service meshes extract communication specific features into a single layer instead of burdening the applications with implementing the communications features. By using service meshes, a common infrastructure component is responsible for the communications or service to service interaction related functionality. As such, applications may be isolated from the communications or service to service interaction related functionality so that applications may be unaware of the communication features implementations.

Service meshes require complex set of networking configuration resources to be deployed to enable traffic routing to external entities, such as, peer network functions (NFs) or external databases and servers. Service meshes facilitate the signaling and the messaging internally between the micro severs. Service meshes may be leveraged when sending messages to external peer nodes. The messages may be routed via the service mesh to the external peer node.

Service meshes may be managed by Kubernetes, an application programming interface (API), that orchestrates microservice resources. The microservice may be deployed to run on a cluster of virtual machines and Kubernetes may schedule containers to run on those virtual machines based on their available compute resources and the resource requirements of each container. Containers may be grouped together and scaled, as necessary. The microservice may also be deployed to run on a bare metal server and Kubernetes may schedule containers to run on the bare metal server. Kubernetes may also automatically manage service discovery, incorporate load balancing, tracks resource allocation, and may scale based on compute utilization. Kubernetes may use native resource objects to perform these functions. Kubernetes may receive information, for example, through different yaml files. Kubernetes may use the information received to allocate one or more microservice resources to the external entities for providing one or more services to consumer entities that may want to use the services.

Typically, when using a service mesh, each of these external peers or servers must be known a-priori so that the set of service mesh configuration resources can be configured statically. The forwarding paths to the external peer nodes are typically statically configured within the service mesh itself via a configuration prior to sending the first messages to the external peer node. The service mesh typically needs to know the characteristics of the external peer node and the end route to the external peer node. As such, service meshes typically statically whitelist external peer nodes by manually configuring the Istio networking configuration resources, which limits the number of services an origin NF may access.

When using dynamic environments to leverage a service mesh, such as, Istio, NF peers are no longer known before hand and must be dynamically discovered through a network repository function (NRF). For example, in 5G environments, NF peers may be dynamically discovered using NRF. As such, deploying service meshes in dynamic environments where NF peers are not previously known may be difficult because service meshes are typically statically configured to communicate with previously known NF peers.

The methods and systems of the present disclosure enable configuration of the service mesh for dynamically discovered peers. This disclosure includes several practical applications that provide benefits and/or solve problems associated with service meshes.

The methods and systems may work in coordination with a Kubernetes control plane to extend the functionality of the service mesh by providing additional components to the service mesh. The methods and systems may create a custom resource objects for newly discovered external entities. Custom resource objects may be a new type of object associated with an external entity for use with the Kubernetes control plane.

In an implementation, a Kubernetes Operator may be provided that reacts to instances of registered Custom Resource Definition Objects (CROs). The custom configuration operator reacts to deployed CROs and any changes therein, to create, modify, and/or delete the set of Istio networking configuration resources in real-time. The operator pattern may extend the Kubernetes API server (control-plane) with a new set of Custom Resource Definition(s) or CRDs. The operator may watch the registered CROs in real-time and may react to any events, such as, create, delete, and/or modify, and may take the necessary action by operating on the respective Istio networking configuration resources. As such, users may sidestep statically configuring or whitelisting external entities and their respective Istio resources with service meshes by providing the NF Application with a dynamic API to configure newly discovered peers through the Custom Configuration Kubernetes Operator.

The methods and systems may create and/or configure service mesh network resources the newly created custom resource objects and may use the service mesh network resources to communicate with the external hosts. The methods and systems may program the route for the newly discovered external hosts within the service mesh prior to communicating with the external hosts. As such, the methods and systems may enable the configuration of service mesh network resources on the fly for newly discovered peers prior to communicating with the external hosts.

Referring now to FIG. 1, illustrated is an example system 100 for use with a service mesh 106 to facilitate communications between one or more consumer entities 102 up to n, where n, is an integer, and one or more external entities 112 up to m, where m, is an integer via network 104. A service mesh 106 may be used to facilitate the signaling and the messaging between the external entities 112 and the consumer entity. Service mesh 106 may require complex set of networking configuration resources to be deployed to enable traffic routing to external entities 112. Network configuration resources may include settings for each external entity 112, such as, but not limited to, whether traffic should be encrypted, a domain name system (DNS) related parameter, and/or circuit breaking configurations. Service mesh 106 may extract communication specific features into a single layer so that the messages from the consumer entities 102 to the external entities 112 may be routed through service mesh 106 without the external entities 112 having to coordinate the communications with the consumer entities 102. In an implementation, service mesh 106 may be an Istio service mesh.

Service mesh 106 may be managed by a Kubernetes control plane 108. Kubernetes control plane 108 may orchestrate resources of a microservice 110. In an implementation, the microservice 110 may be deployed to run on a virtual machine (VM) infrastructure with clusters of virtual machines and Kubernetes control plane 108 may schedule containers to run on the virtual machines based on their available compute resources and the resource requirements of each container. Containers may be grouped together and scaled, as necessary. Kubernetes control plane 108 may allocate one or more virtual machines for external entities 112 to use to provide the service 10 to one or more consumer entities 102. In another implementation, the microservice 110 may be deployed to run on a bare metal server and Kubernetes control plane 108 may schedule containers to run on the bare metal server. Containers may be grouped together, as necessary.

Kubernetes control plane 108 may also automatically manages service discovery, incorporate load balancing, tracks resource allocation, and may scale based on compute utilization. Kubernetes control plane 108 may use native resource objects to perform these functions. In addition, Kubernetes control plane 108 may receive information, for example, through different yaml files. Kubernetes may use the information received to allocate one or more resources of the microservice 110 to the external entities 112 for providing one or more services 10 to consumer entities 102 that may want to use the services. For example, in the virtual machine implementation of the microservice 110, Kubernetes may allocate one or more virtual machines to the external entities 112 for providing one or more services 10.

Figure 2:
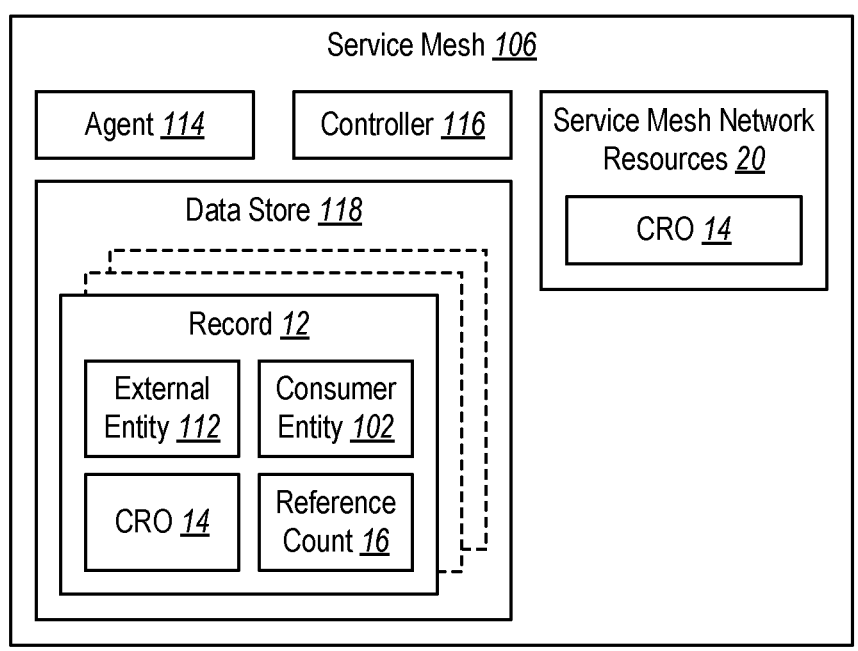
FIG. 2 illustrates an example service mesh in accordance with an implementation of the present disclosure.

Referring now to FIG. 2, illustrated is an example service mesh 106 for use with system 100 (FIG. 1). System 100 may be a dynamic environment where consumer entities 102 may discover one or more services 10 provided by external entities 112 via a network 104. In an implementation, system 100 may be a 5G system where consumer entities 102 use one or more of The $3^{rd}$ Generation Partnership Project (3GPP) network protocols to discover one or more services 10, such as network functions (NF)s provided by external entities 112.

Service mesh 106 may include an agent 114 that may be used to create custom resource objects (CROs) 14 for newly discovered external entities 112 (FIG. 1). In an implementation, the external entities 112 may be peer network functions (NF). NFs may be dynamically discovered through a network repository function (NRF).

Agent 114 may expose one or more APIs to consumer entity 102 and consumer entity 102 may call the APIs in response to discovering one or more external entities 112 and/or the services provided by the external entities 112. Agent 114 may create new CROs for one or more external entities 112 in response to API calls generated by one or more consumer entities 102.

A CRO 14 may be a new type of object associated with an external entity 112 for use with the Kubernetes control plane 108. CROs 14 may be different from the native resource objects used by the Kubernetes control plane 108. CROs 14 may include custom resource definitions that define what items are required for the CRO 14. Example of custom resource definitions may include, but are not limited to, host presence, annotation owner presence, host information, routing information, and/or timeout information. The custom resource definitions may be specific to the services 10 and/or the external entity 112 or a use case. As such, different external entities 112 may have different custom resource definitions for the CROs 14 associated with the external entities 112.

The CRO 14 may be transmitted to a controller 116. Controller 116 may handle or control the CROs 14. Controller 116 may register with the Kubernetes control plane 108 and may notify the Kubernetes control plane 108 that controller 116 controls the CROs 14 created by agent 114. As such, the Kubernetes control plane 108 may handover operations for the new CRO 14 for the external entity 112 to controller 116.

Controller 116 may send a request to the Kubernetes control plane 108 to create one or more service mesh network resources 20 for the CRO 14. Service mesh resources 20 may include, but are not limited to, service entry, virtual services, destination rules, route rules, gateways, and/or quotas. Kubernetes control plane 108 may configure proxies and/or agents with the correct configurations for the service mesh network resources 20. For example, Kubernetes control plane 108 may use custom resource definitions from the CRO 14 to configure the service mesh network resources 20. The service mesh resources 20 may be used by consumer entity 102 to communicate with the external entity 112 and access or otherwise use a service 10 provided by the external entity 112.

Service mesh 106 may also include a data store 118. Data store 118 may be a globally accessible data store that stores records 12 for one or more services 10 provided by one or more external entities 112. Each record 12 may include the CRO 14 for the service 10 provided by the external entity 112. Data store 118 may have a single record 12 per service 10 provided by the external entity 112. Thus, services 10 provided by the external entities 112 may not have duplicative entries in data store 118 since service mesh 106 may not be able to handle multiple CROs 14 for the same service 10.

In addition, each record may include a reference count 16 that indicates a total number of consumer entities 102 that have requested to use the service 10 provided by the external entity 112. The reference count may be increased each time a new consumer entity 102 requests to use the external entity 112. In addition, the reference count may also include an association with the consumer entities 102 that have requested to use the service 10 provided by the external entity 112 (e.g., the name of the consumer entity 102 may be stored with the reference count). As such, data store 118 may store the CROs 14 created for newly discovered services 10 provided by external entities 112 and may maintain an association of all the consumer entities interested in using the newly discovered services 10.

Agent 114, controller 116, and/or data store 118 may be used in combination with the Kubernetes control plane 108 to allow the service mesh 106 to provide secure communications between one or more consumer entities 102 and one or more newly discovered external entities 112. Thus, instead of statically configuring the service mesh 106 with previously known external entities, agent 114, controller 116, and/or data store 118 may allow service mesh 106 to be used in dynamic environments where the configuration parameters or resources of the external entities 112 are unknown prior to the discovery of the external entity 112.

Service mesh 106 may include features and functionality described below in connection with FIG. 7. In addition, the components of service mesh 106 may include hardware, software, or both. For example, the components of service mesh 106 may include one or more instructions stored on a computer-readable storage medium and executable by processors of one or more computing devices. When executed by the one or more processors, the computer-executable instructions of one or more computing devices (e.g., service mesh 106) can perform one or more methods described herein. Alternatively, the components of service mesh 106 may include hardware, such as a special purpose processing device to perform a certain function or group of functions. Additionally, or alternatively, the components of service mesh 106 may include a combination of computer-executable instructions and hardware.

Figure 3:
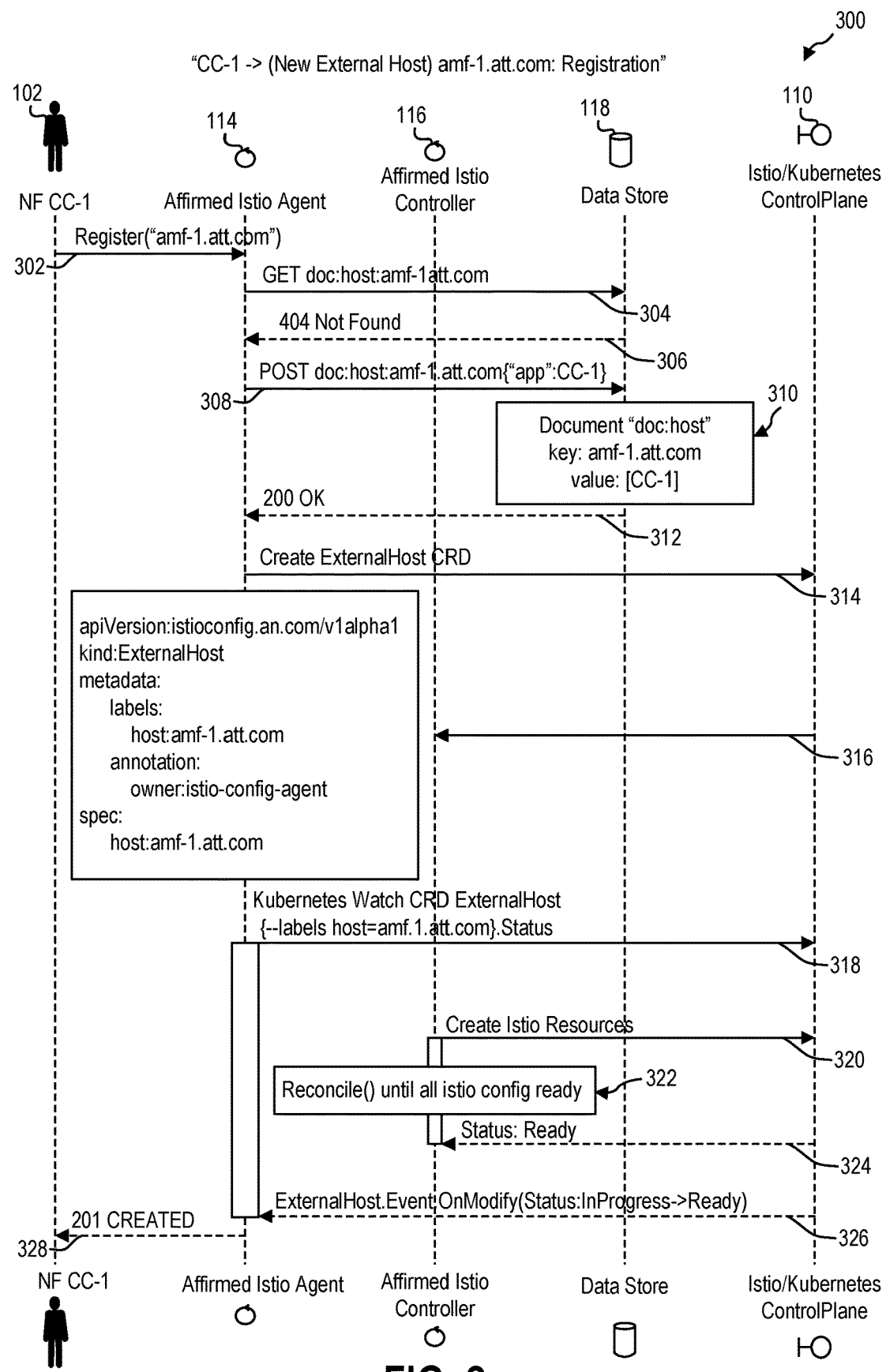
FIG. 3 illustrates an example call flow for a new external entity registration with a service mesh in accordance with an implementation of the present disclosure.

Referring now to FIG. 3, an example call flow 300 for a new external entity registration may be discussed in reference to the architecture of FIGS. 1 and 2. Consumer entity 102 may want to consume a newly discovered service provided by an external entity 112. In the illustrated example, consumer entity 102 may be a network function call control (NF CC), the external entity 112 may be "amf-1.att.com." Consumer entity 102 may have discovered, for example, through the 3GPP protocols a service provided by the external entity 112. Call flow 300 may be used to notify the service mesh 106 of the external entity 112 and the service provided by the external entity 112 so consumer entity 102 may start using the service. Istio is used in call flow 300 as an illustrative example of the service mesh 106 type. As such, agent 114 may be an Istio agent and controller 116 may be an Istio controller.

At 302, a consumer entity 102 may send a registration message for an external entity 112 to agent 114. Agent 114 may expose APIs to one or more consumer entities 102 to call. The registration message may be in response to a rest API exposed by agent 114. For example, the registration message may include a name for the external entity 112.

At 304, agent 114 may send a message to data store 118 with a request for the external entity 112. For example, the message may include the name for the external entity 112. Data store 118 may be a globally accessible data store that stores records for the external entities 112 when CROs 14 are created for the external entities 112 when created.

Data store 118 may verify whether a record exists for the external entity 112, for example, by comparing the name for the external entity 112 to the records 12 stored in data store 118. By verifying whether the external entity 112 previously exists in data store 118, duplication of records 12 for the same external entity 112 may be prevented. Service mesh 106 may not be able to handle multiple CROs 14 for the same external entity 112.

At 306, data store 118 may send a reply message indicating that the external entity 112 is not found in data store 118. For example, if a match between the name for the external entity 112 and the records 12 in data store 118 does not occur, data store 118 may determine that a record 12 for the external entity 112 does not exist in data store 118.

At 308, agent 114 may send a request to create a record 12 for the external entity 112 to data store 118. The request may include the name for the external entity 112 and the consumer entity 102 making the request.

At 310, data store 118 may create a record 12 for the external entity 112. Data store 118 may include a reference count 16 that indicates the total number of consumer entities 102 that have requested to use the external entity 112. In the illustrative example, consumer entity 102 (e.g., NF CC-1) may be the first consumer entity to request use of the external entity 112. As such, the reference count may be 1. In addition, the reference count may include an association with the consumer entity 102 (e.g., the name NF CC-1 of consumer entity 102). The record 12 may also be used to store the CROs 14 associated with the external entities 112 when created. At 312, data store 118 may send a verification message to agent 114 verifying creation of the record 12 for the external entity 112.

At 314, agent 114 may send a create message to the Kubernetes control plane 108 to create a new set of Custom Resource Definition(s) CRDs for a new CRO 14 for the external entity 112. The create message may include any custom definitions for the CRO 14. For example, agent 114 may identify details to include for the CRO 14, such as, but not limited to, the name of the external entity 112 and/or information about an annotation owners for the CRO. Each CRO 14 may have different CRDs. Thus, each CRO 14 may be designed specifically for different external entities 112. Kubernetes control plane 108 may create a new CRO 14 for the external entity 112 with the set of Custom Resource Definition(s) CRDs provided by agent 114.

At 316, Kubernetes control plane 108 may send the new CRO 14 for the external entity 112 to controller 116. Controller 116 may have registered with Kubernetes control plane 108 and notified Kubernetes control plane 108 that controller 116 is in charge of new CROs 14 dynamically created. As such, Kubernetes control plane 108 may handover control of the new CRO 14 for the external entity 112 to controller 116.

At 318, agent 114 may send a watch message to Kubernetes control plane 108 to start monitoring a status of the CRO 14 for external entity 112. The watch message may allow agent 114 to receive notifications on any updates relating to changes of the CRO 14 for external entity 112. If consumer entity 102 starts communicating with external entity 112 prior to the service mesh 106 being configured, the communication may fail. The watch message may prevent consumer entity 102 from communicating with the external entity 112 prior to the service mesh 106 being configured with the correct resources for the CRO 14.

At 320, controller 116 may send a create Istio network resources message to Kubernetes control plane 108. Controller 116 may wake up upon receiving the CRO 14 and may instruct Kubernetes control plane 108 to create one or more Istio network resources for CRO 14. Istio resources may include, but are not limited to, service entry, virtual services, destination rules, route rules, gateways, and/or quotas. Kubernetes control plane 108 may configure proxies and/or agents with the correct configurations for the Istio network resources.

At 322, controller 116 may check whether the configuration for the Istio network resources is complete. The configuration of the Istio network resources for CRO 14 may take a period of time to complete. During this period of time, controller 116 may continue to check a status of the configuration.

At 324, controller 116 may receive a status ready message from Kubernetes control plane 108 in response to the completion of the configuration of the Istio network resources for CRO 14. In addition, at 326, Kubernetes control plane 108 may send a notification to agent 114 in response to the completion of the configuration of Istio resources for CRO 14. As such, agent 114 may receive a notification indicating that the status of the CRO 14 for the external entity 112 is ready.

At 328, agent 114 may send a completion message to consumer entity 102 indicating that the service mesh 106 is ready for communications with external entity 112. Consumer entity 102 may start communicating with external entity 112 using the Istio resources for CRO 14 in response to receiving the completion message. For example, consumer entity 102 may access, or otherwise use, a service 10 provided by the external entity 112 using the service mesh 106.

Figure 4:
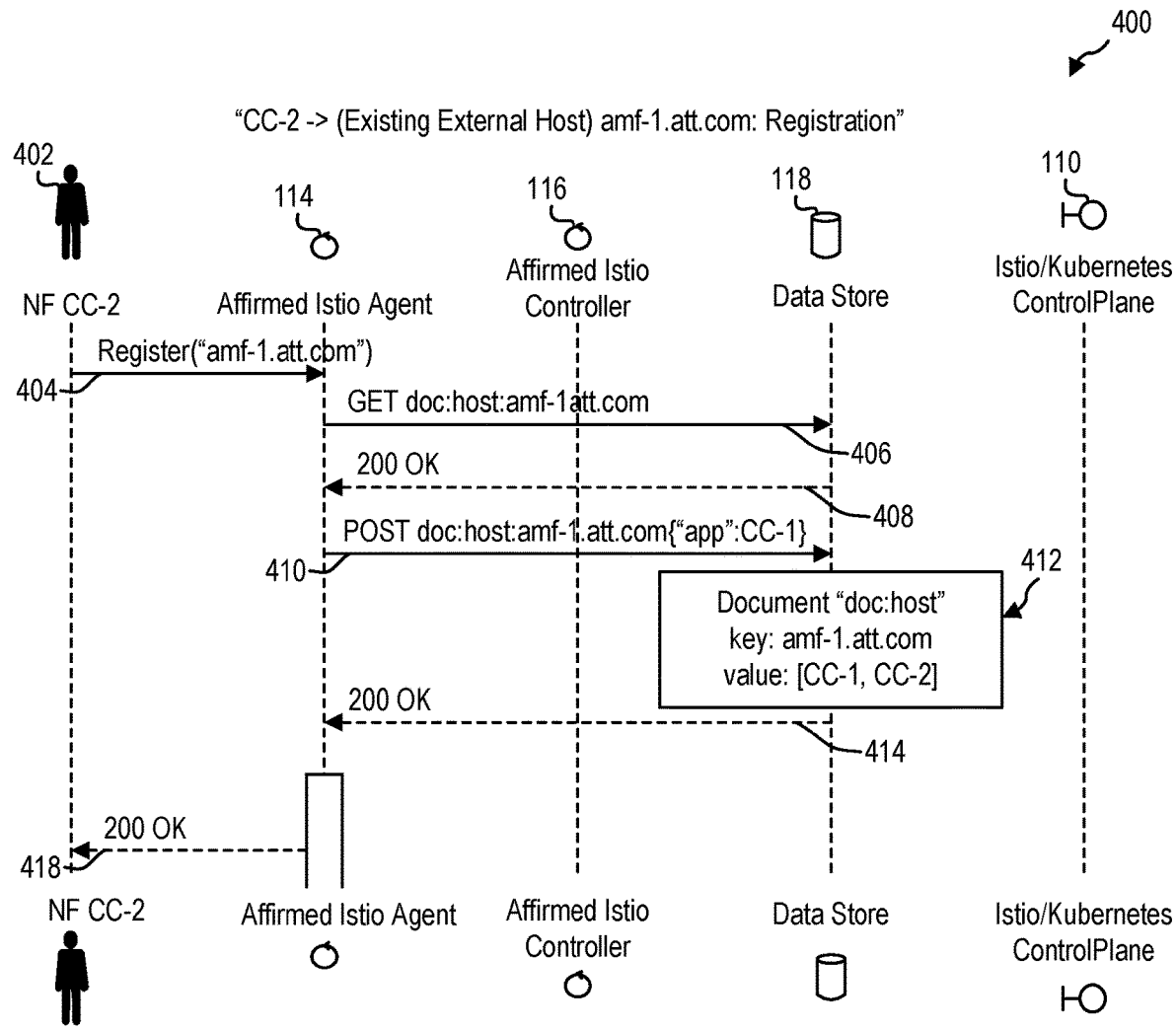
FIG. 4 illustrates an example call flow for an existing external entity registration with a service mesh in accordance with an implementation of the present disclosure.

Referring now to FIG. 4, an example call flow 400 for an existing external entity registration may be discussed in reference to the architecture of FIGS. 1 and 2. Consumer entity 402 may want to consume a discovered service provided by an external entity 112. In the illustrated example, consumer entity 402 may be a different network function call control (NF CC-2) operating on system 100 than consumer entity 102 (FIG. 3) and the external entity 112 may be the same "amf-1.att.com." Consumer entity 402 may have discovered, for example, through the 3GPP protocols a service provided by the external entity 112. Call flow 400 may be used to notify the service mesh 106 that consumer entity 402 wants to communicate with external entity 112 and start using the service provided by external entity 112. Istio is used in call flow 400 as an illustrative example of the service mesh 106 type. As such, agent 114 may be an Istio agent and controller 116 may be an Istio controller.

At 404, a consumer entity 402 may send a registration message for an external entity 112 to agent 114. Agent 114 may expose APIs to one or more consumer entities 402 to call. The registration message may be in response to a rest API exposed by agent 114. For example, the registration message may include a name for the external entity 112.

At 406, agent 114 may send a message to data store 118 with a request for the external entity 112. For example, the message may include the name for the external entity 112. Data store 118 may verify whether a record exists for the external entity 112, for example, by comparing the name for the external entity 112 to the records 12 stored in data store 118. By verifying whether the external entity 112 exists in data store 118, a record 12 already created for the external entity 112 in data store 118 may be used. For example, consumer entity 102 may have previously requested to use the services provided by external entity 112. As such, data store 118 may already have a record 12 for the external entity 112.

At 408, data store 118 may send a reply message to agent 114 indicating that the external entity 112 is found in data store 118. For example, if a match occurs between the name for the external entity 112 and the records 12 in data store 118, data store 118 may determine that a record 12 exits for the external entity 112 in data store 118.

At 410, agent 114 may send a request to data store 118 to access a record 12 for the external entity 112. The request may include the name for the external entity 112 and the consumer entity 402 making the request.

At 412, data store 118 may access a record 12 for the external entity 112. Data store 118 may include a reference count 16 that indicates a total number of consumer entities 402, 102 that have requested to use the external entity 112. For example, if consumer entity 102 previously requested use of the external entity 112 (FIG. 3), the reference count 16 may be increased by one to two. In addition, the reference count 16 may also include an association to the consumer entities that requested use of the external entity 112 (e.g., the reference count 16 may also include the names of the consumer entities, NF CC-1 and NF CC-2). As such, the record 12 for the external entity 112 may be updated in response to a new request to use the external entity 112. At 414, data store 118 may send a verification message to agent 114 verifying the external entity 112 is registered and that the new request is added to the record 12.

At 418, agent 114 may send a completion message to consumer entity 402 indicating that the service mesh 106 is ready for external entity 112. Consumer entity 402 may start communicating with external entity 112 using the Istio resources for CRO 14 in response to receiving the completion message. For example, consumer entity 102 may access, or otherwise use, a service 10 provided by the external entity 112 using the service mesh 106.

In call flow 400, the creation of the Istio network resources in the service mesh does not occur in response to receiving the registration request. Since the Istio network resources were previously created in response to consumer entity 102 requesting use of the external entity 112 as indicated in the record 12 in data store 118 for the external entity 112. As such, consumer entity 402 may use the Istio network resources already created for the external entity 112 for communicating with the external entity 112.

Figure 5A:
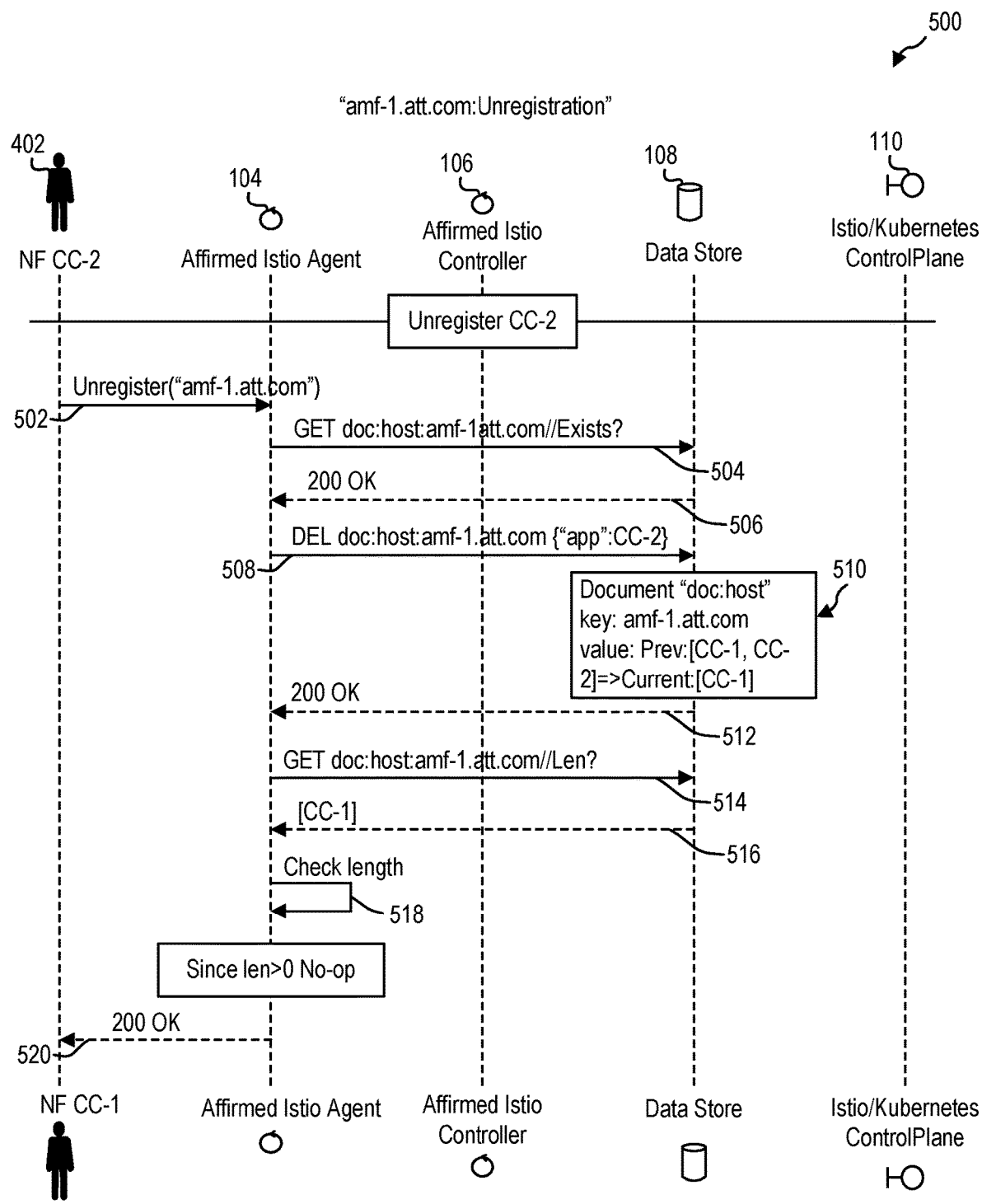
FIGS. 5A and 5B illustrate an example call flow for unregistering an external entity with a service mesh in accordance with an implementation of the present disclosure.
Figure 5B:
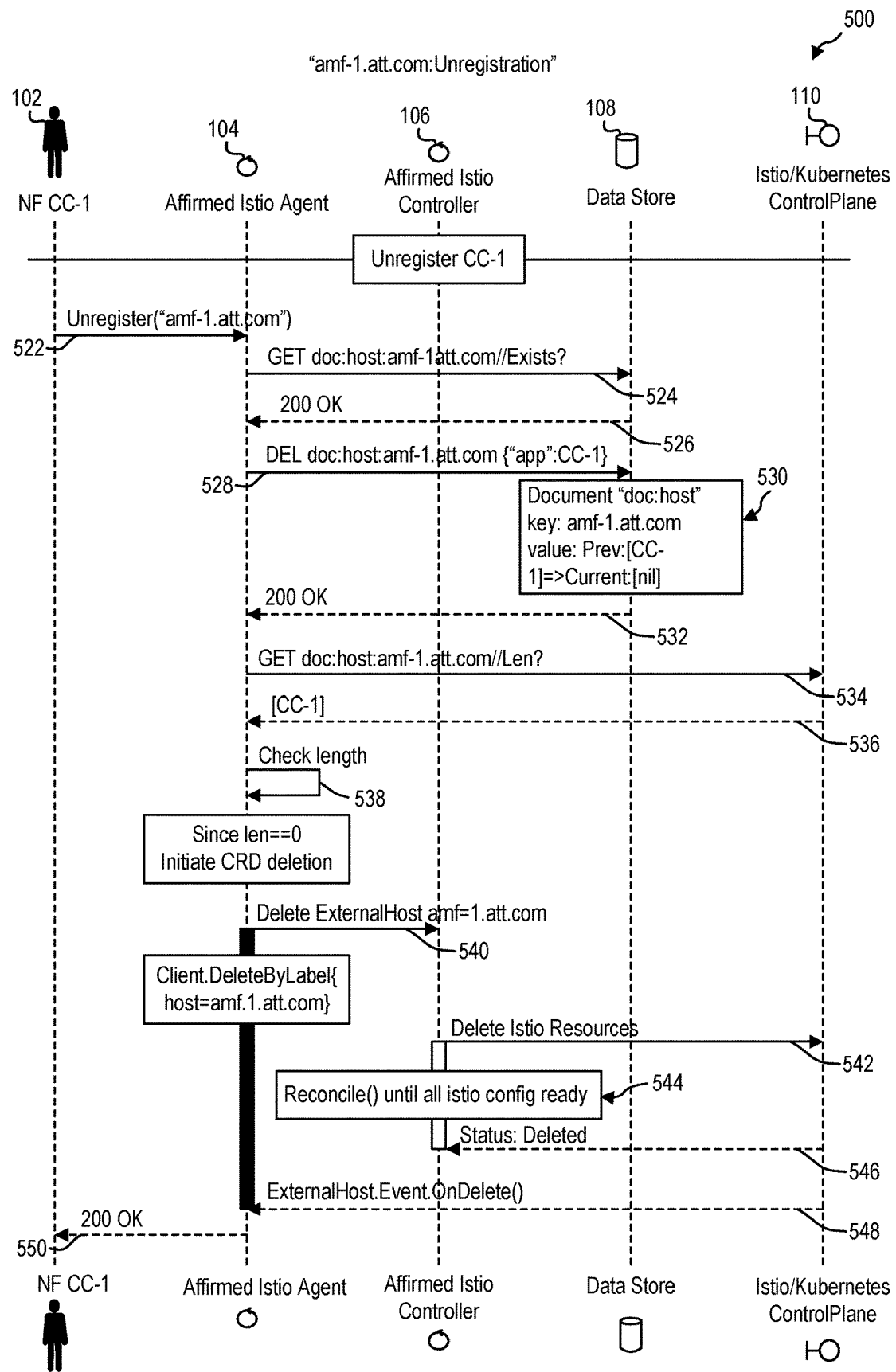

Referring now to FIGS. 5A and 5B, an example call flow 500 for unregistering an external entity may be discussed in reference to the architecture of FIGS. 1 and 2. In the illustrated example, consumer entity 402 may be a network function call control (NF CC-2) consumer entity 102 may be a network function call control (NF CC-1), and the external entity 112 may be "amf-1.att.com." Istio is used in call flow 500 as an illustrative example of the service mesh 106 type. As such, agent 114 may be an Istio agent and controller 116 may be an Istio controller.

Call flow 500 may be used to unregister the external entity 112 from the service mesh 106. The external entity 112 may be unregistered because the external entity 112 has failed and/or gone out of service. Another example for unregistering the external entity 112 may include consumer entities 402, 102 may no longer need the service provided by an external entity 112 and/or may no longer need to communicate with external entity 112. For example, messages are no longer being sent to external entity 112 from consumer entities 402, 102.

At 502, consumer entity 402 may send a request to agent 114 to unregister the external entity 112. For example, consumer entity 402 may no longer want to communicate with the external entity 112 and/or may be finished using the service provided by the external entity 112. The unregister message may include the name of the external entity 112 to remove.

At 504, agent 114 may send a message to data store 118 verifying whether the external entity 112 exists in the records of data store 118. Data store 118 may compare the name for the external entity 112 to the records 12 stored within data store 118 to verify whether a record exists for the external entity 112.

At 506, data store 118 may send a reply message to agent 114 indicating that the external entity 112 exists in data store 118. For example, if a match occurs between the name for the external entity 112 and a record 12 in data store 118, data store 118 may send a reply message to agent 114 notifying agent 114 that a record 12 for the external entity 112 exists.

At 508, agent 114 may send a deletion request to data store 118 to delete an association with consumer entity 402 for the external entity 112. The deletion request may include the name of the external entity 112 and the consumer entity 402 identity.

At 510, data store 118 may update the record 12 for the CRO 14 associated with the external entity 112. Data store 118 may update the reference count 16 by decreasing the reference count 16 by one. In addition, data store 118 may remove the consumer entity 402 from the record 12 so that any association for the consumer entity 402 with the CRO 14 for the external entity 112 is removed from the record 12. For example, if both consumer entity 402 and consumer entity 102 were associated with the external entity 112 after requesting to register with the external entity 112, data store 118 may decrease the reference count for the external entity 112 from two to one. In addition, data store 118 may remove the association of consumer entity 402 from the reference count so that the current reference count is now 1 and only consumer entity 102 remains associated with the reference count. At 512, data store 118 may send a verification message to agent 114 verifying that the consumer entity 402 has been deleted from the record 12 for the external entity 112.

At 514, agent 114 may send a request to the data store 118 for the value of the reference count for the external entity 112. The request may include the name of the external entity 112. At 516, data store 118 may provide agent 114 with the value of the reference count. In this example, the value of the reference count may be one.

At 518, agent 114 may verify whether the value of the reference count is greater than zero. If the value of the reference count is greater than zero, another consumer entity may be using the external entity 112. For example, consumer entity 102 may be using the services provided by the external entity 112. As such, if the value of the reference count is greater than zero, agent 114 may take no further actions with the unregistering process. The Istio resources created for service mesh 106 may remain operable and other consumer entities may be able to access the services provided by the external entity 112.

At 520, agent 114 may send a completion message to consumer entity 402 notifying consumer entity 402 that the external entity 112 has been unregistered from consumer entity 402. As such, consumer entity 402 may no longer have access to the services provided by external entity 112 since the association between consumer entity 402 and the external entity 112 has been removed.

At 522, consumer entity 102 may send a request to agent 114 to unregister the external entity 112. For example, consumer entity 102 may no longer want to communicate with the external entity 112 and/or may be finished using the service provided by the external entity 112. The unregister message may include the name of the external entity 112 to remove.

At 524, agent 114 may send a message to data store 118 verifying whether the external entity 112 exists in the records 12 of data store 118. Data store 118 may compare the name for the external entity 112 to the records 12 stored in data store 118 to verify that a record 12 exists for the external entity 112.

At 526, data store 118 may send a reply message to agent 114 indicating that a record 12 exists in data store 118 for external entity 112. For example, if a match occurs between the name for the external entity 112 and a record 12, data store 118 may determine that a record 12 for the external entity 112 exists in data store 118.

At 528, agent 114 may send a deletion request to data store 118 to delete an association with consumer entity 102 for the external entity 112. The deletion request may include the name of the external entity 112 and the identity of consumer entity 102.

At 530, data store 118 may update the record 12 for the external entity 112. Data store 118 may update the reference count 16 for the external entity 112 by decreasing the reference count 16 by one. In addition, data store 118 may remove any association of the consumer entity 102 from the record 12 so that the association of the consumer entity 102 with the external entity 112 is removed. For example, if consumer entity 102 is the remaining consumer entity associated with the external entity 112, data store 118 may decrease the reference count 16 for the external entity 112 to zero. In addition, data store 118 may remove consumer entity 102 from the reference count so that the current reference count is now zero with no consumer entities associated with the reference count 16.

At 532, data store 118 may send a verification message to agent 114 verifying that the consumer entity 102 has been deleted from the record 12 for the external entity 112. At 534, agent 114 may send a request to the data store 118 for the value of the reference count 16 for the external entity 112. The request may include the name of the external entity 112.

At 536, data store 118 may provide agent 114 with the value of the reference count 16. In this example, the value of the reference count 16 may be zero. At 538, agent 114 may verify whether the value of the reference count is greater than zero. If the value of the reference count is equal to zero, no consumer entities are currently associated with the external entity 112, and thus, the external entity 112 may no longer be in use by any consumer entity within system 100. As such, the CRO 14 for the external entity 112 may be removed from the service mesh 106.

At 540, agent 114 may send a delete request to controller 116 to delete the external entity 112. The delete request may include the name of the external entity 112. At 542, controller 116 may send a delete resources request to Kubernetes control plane 108. Kubernetes control plane 108 may delete the configurations for the Istio network resources associated with the CRO 14 for the external entity 112. As such, the Istio network resources may be deleted from the service mesh 106 for the CRO associated with the external entity 112.

At 544, controller 116 may check whether the deletions for the Istio network resources are complete. The removal of the Istio network resources for CRO 14 may take a period of time to complete. During this period of time, controller 116 continues to check a status of the deletion.

At 546, controller 116 may receive a status deleted message from Kubernetes control plane 108 in response to the removal of the Istio network resources for CRO 14 from the service mesh 106. At 548, Kubernetes control plane 108 may also send a notification to agent 114 in response to the deletion of the Istio network resources for CRO 14. As such, agent 114 may receive a notification indicating that a change for the CRO 14 and that the CRO 14 has been removed from the service mesh 106.

At 550, agent 114 may send a completion message to consumer entity 102 indicating that the consumer entity 102 has been un-registered from the external entity 112. The services provided by the external entity 112 may no longer be accessible to the consumer entity 102. In addition, the services provided by the external entity 112 may no longer be accessible to other consumer entities within system 100 without sending a new request to register with the external entity 112.

Figure 6:
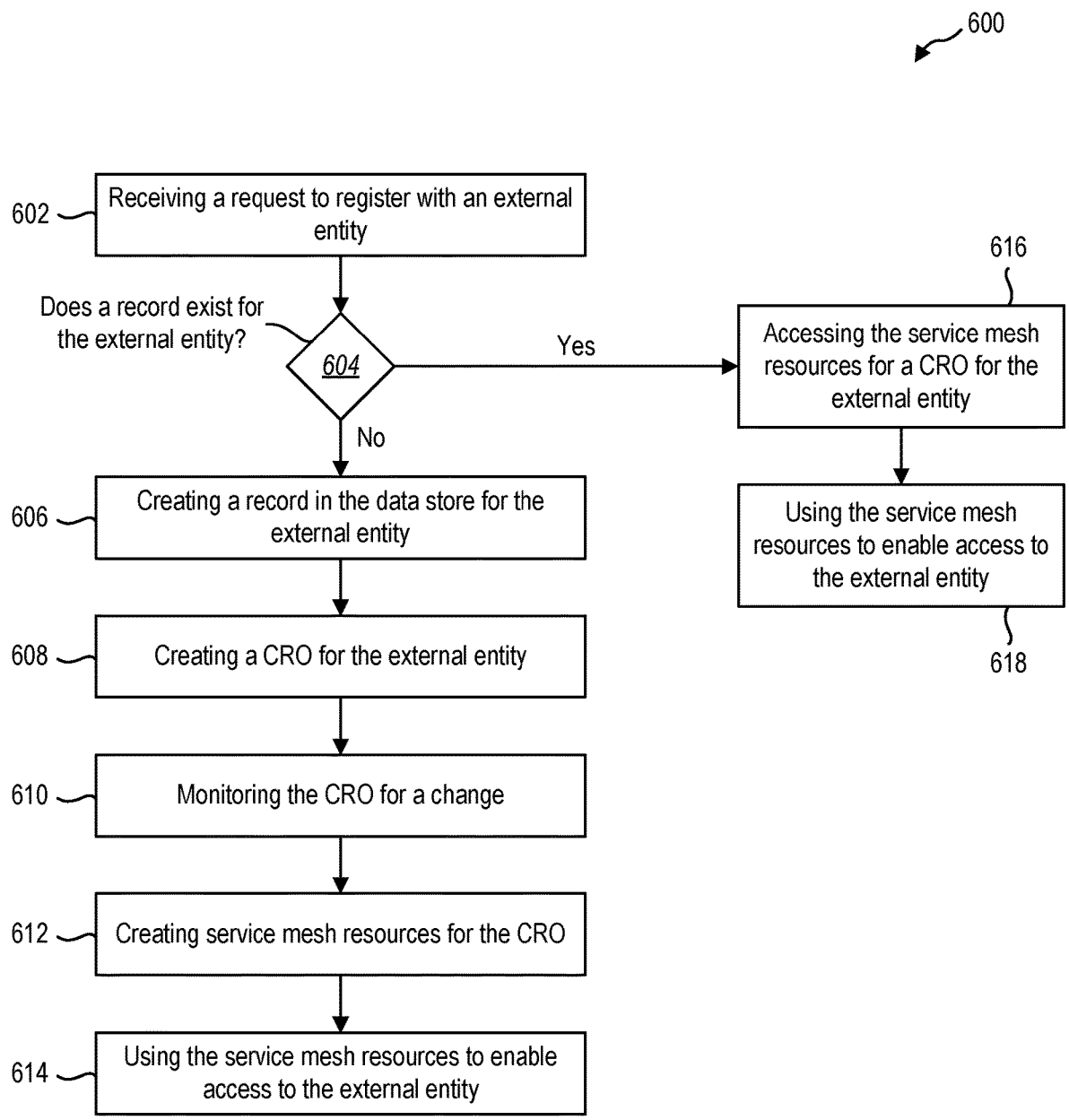
FIG. 6 is an example method for configuring service mesh network resources for dynamically discovered peers in accordance with an implementation of the present disclosure.

Referring now to FIG. 6, a method 600 for configuring service mesh network resources 20 (FIG. 2) for dynamically discovered peers or network functions (NFs) may be executed by a service mesh 106 (FIG. 1). For example, one or more of a controller 116 (FIG. 2), an agent 114 (FIG. 2), and/or a data store 118 (FIG. 2) may perform the actions of method 600. In an implementation, the service mesh 106 may be an Istio service mesh. The actions of method 600 may be discussed below with reference to the architecture of FIGS. 1 and 2.

At 602, method 600 may include receiving a request from a consumer entity to register with an external entity. Consumer entity 102 may have discovered, for example, through the 3GPP protocols a service 10 provided by the external entity 112. The external entity may be a peer network function (NF). The request may be used to notify the service mesh 106 that consumer entity 102 wants to access or otherwise use a service 10 provided by external entity 112. For example, consumer entity 102 may be operating in a dynamic environment, such as, a 5G environment, where services 10 and/or external entities 112 may be dynamically discovered through a network repository function (NRF). As such, consumer entity 102 may discover new services 10 provided by one or more external entities 112 and/or may discover different services 10 provided by one or more external entities 112. Agent 114 may receive the request from consumer entity 102 in response to exposing one or more APIs to consumer entity 102.

At 604, method 600 may include determining whether a record exists for the external entity in a data store. Agent 114 may send a message to data store 118 with the name for the external entity 112. Data store 118 may be a globally accessible data store that stores records 12 for one or more services 10 provided by external entities 112. Data store 118 may verify whether a record 12 exists for the service 10 provided by external entity 112 in the data store 118. By verifying whether a record 12 already exists for the service 10 in the data store 118, duplication of records 12 for the same external entity 112 may be prevented.

At 606, method 600 may include creating a record in the data store for the external entity. Data store 118 may create a record for the service 10 provided by external entity 112 in response to determining that a record 12 does not exists for the external entity 112. As such, service 10 may be previously unknown to the service mesh 106 prior to consumer entity 102 discovering service 10. Data store 118 may include a reference count 16 that indicates a total number of consumer entities 102 that have requested to use the service 10 provided by external entity 112. In addition, the reference count 16 may also include an association with the consumer entities that have requested to use the service 10 provided by the external entity 112. The record 12 may also be used to store the CROs 14 for the service 10 provided by the external entity 112 when created.

At 608, method 600 may include creating a CRO for the external entity. Agent 114 may send a create message to the Kubernetes control plane 108 to create a new CRO 14 for the external entity 112. The create message may include any custom definitions for the CRO 14. For example, Agent 114 may identify details to include for the CRO 14, such as, but not limited to, the name of the external entity 112, routing requirements for communications with the service 10, routing requirements for communications with the external entity 112, information about an annotation owner, and/or any other characteristics of the service 10 and/or external entity 112. Each CRO 14 may have different CRDs. Thus, each CRO 14 may be designed specifically for different services 10 and/or different external entities 112. Kubernetes control plane 108 may dynamically create a new CRO 14 for the services 10 provided by the external entity 112 with the set of Custom Resource Definition(s) CRDs provided by Agent 114.

At 610, method 600 may include monitoring the CRO for a change. Agent 114 may start a watch on the CRO 14 for a service 10 provided by external entity 112 to monitor a status of the CRO 14. The watch message may allow agent 114 to receive notifications on any updates relating to changes of the CRO 14. Changes may include, for example, a creation of the CRO 14, a modification of the CRO 14, and/or a deletion of the CRO 14. Agent 114 may communicate the changes to controller 116. Agent 114 and/or controller 116 may perform one or more actions in response to receiving a notification of a change of the CRO 14. For example, when the change is a creation of the CRO 14, controller 116 may perform an action requesting the creation of one or more service mesh network resources 20 for the CRO 14. In another example, when the change is a deletion of the CRO 14, controller 116 may perform an action requesting the deletion of one or more service mesh network resources 20 for the CRO 14. In another example, when the change is a modification of the CRO 14, controller 116 may perform an action requesting modifications to one or more service mesh network resources 20 for the CRO 14.

At 612, method 600 may include creating service mesh resources for the CRO. Controller 116 may receive the CRO 14 and may instruct Kubernetes control plane 108 to create one or more service mesh network resources 20 for the CRO 14. Service mesh network resources 20 may include, but are not limited to, service entry, virtual services, destination rules, route rules, gateways, and/or quotas. Kubernetes control plane 108 may configure proxies and/or agents with the correct configurations for the service mesh network resources 20. For example, Kubernetes control plane 108 may use the custom resource definitions in the CRO 14 in determining the configurations for the service mesh network resource 20. As such, Kubernetes control plane 108 may configure a route for the newly discovered external entity 112 within service mesh 106 on the fly.

Controller 116 and/or agent 114 may monitor the status of the configuration of the service mesh network resources 20. Controller 116 and/or agent 114 may receive a notification from Kubernetes control plane 108 indicating the completion of the configuration of the service mesh network resources 20 for CRO 14.

At 614, method 600 may include using the service mesh resources to enable the consumer entity access to the external entity. Agent 114 may send a notification to the consumer entity 102 indicating that the service mesh 106 is ready for communications with external entity 112. Consumer entity 102 may start communicating with external entity 112 using the service mesh network resources 20 for CRO 14. For example, the service mesh network resources 20 may enable communications between consumer entity 102 and a service 10 so that consumer entity 102 may access, or otherwise use, the service 10 provided by the external entity 112.

At 616, method 600 may include accessing the service mesh resources for a CRO for the external entity. If a record 12 already exists in data store 118 for the service 10 provided by external entity 112, the consumer entity 102 may access the service mesh network resources 20 already created for a CRO 14 associated with the service provided by external entity 112. Instead of creating a duplicative CRO 14 and service mesh network resources 20 in response to the request from consumer entity 102 to use the service 10 provided by external entity 112, if another consumer entity previously requested to register with the service 10 provided by external entity 112, the service mesh network resources 20 previously established for the service 10 provided by external entity 112 may be used for consumer entity 102.

At 618, method 600 may include using the service mesh resources to enable the consumer entity access to the external entity. Consumer entity 102 may start communicating with external entity 112 using the service mesh network resources 20 for CRO 14. For example, consumer entity 102 may access, or otherwise use, a service 10 provided by the external entity 112 using the service mesh network resources 20.

As such, method 600 may be used to dynamically create and configure service mesh resources as new network functions provided by one or more external entities 112 are discovered.

Figure 7:
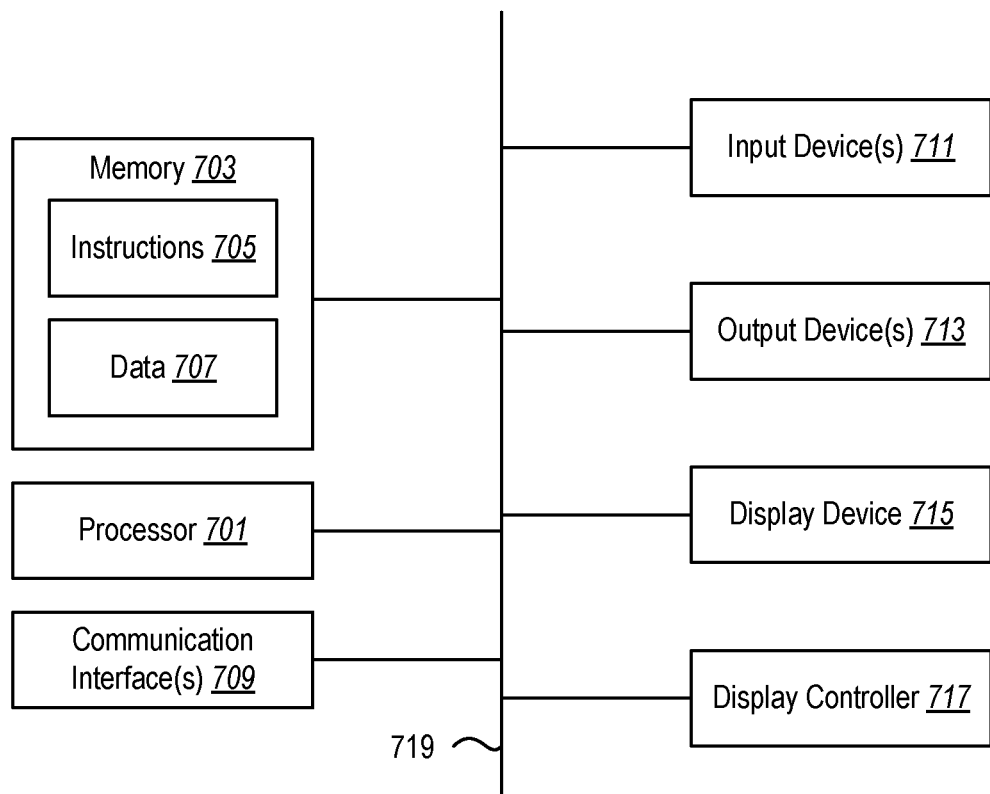
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
one or more processors;
memory in electronic communication with the one or more processors;
a data store; and
instructions stored in the memory, the instructions being executable by the one or more processors to:
receive a request, at a service mesh network, from a consumer entity to register with an external entity that provides a service, wherein the service is discovered by the consumer entity using a network repository function in a 5G network, and wherein the service is unknown to the service mesh network prior to receiving the request from the consumer entry;
create a record in the datastore for the service to maintain an association of the consumer entity using the service;
create, in response to receiving the request from the consumer entity, a custom resource object for the service provided by the external entity, wherein the custom resource object includes custom resource definitions that define characteristics of the service and routing requirements for communications with the service;
provide the custom resource object to a Kubernetes control plane that manages network resources of the service mesh network and instruct the Kubernetes control plane to dynamically create one or more service mesh network resources for the custom resource object and configure the one or more service mesh network resources using the custom resource definitions; and
enable communications from the consumer entity to access the service provided by the external entity by using the one or more service mesh network resources.

2. The system of claim 1, wherein the instructions are further executable by the one or more processors to:
monitor the custom resource object; and
perform one or more actions relating to the one or more service mesh network resources in response to a change of the custom resource object, wherein the change includes one or more of a creation, a modification, or a deletion.

3. The system of claim 2, wherein the instructions are further executable by the one or more processors to:
delete the one or more service mesh network resources for the custom resource object in response to the deletion of the custom resource object,
wherein the communications between the consumer entity and the external entity are not enabled in response to the one or more service mesh network resources being deleted.

4. The system of claim 1, wherein the instructions are further executable by the one or more processors to:
update the record in the data store for the service with the custom resource object; and
increase a reference count for the custom resource object by one, wherein the reference count is used to identify the association with the consumer entity using the service.

5. The system of claim 4, wherein the instructions are further executable by the one or more processors to:
receive a second request from a second consumer entity to register with the service provided by the external entity;
determine that the record for the service exists in the data store; and
increase the reference count for the custom resource object in the data store by one and update the association to the service to include the second consumer entity.

6. The system of claim 4, wherein the instructions are further executable by the one or more processors to:
enable the second consumer entity access to the service by using the one or more service mesh network resources for the custom resource object for the service.

7. The system of claim 1, wherein the service mesh network resources include one or more of service entries, virtual services, destination rules, route rules, gateways, or quotas.

8. The system of claim 1, wherein the custom resource definitions are created specifically for the service.

9. A method, comprising:
receiving a request, at a service mesh network, from a consumer entity to register with an external entity that provides a service, wherein the service is discovered by the consumer entity using a network repository function in a 5G network, and wherein the service is unknown to the service mesh network prior to receiving the request from the consumer entity;
creating a record in a datastore for the service to maintain an association of the consumer entity using the service;
creating, in response to receiving the request from the consumer entity, a custom resource object for the service provided by the external entity, wherein the custom resource object includes custom resource definitions that define characteristics of the service and routing requirements for communications with the service;
providing the custom resource object to a Kubernetes control plane that manages network resources of the service mesh network and instructs the Kubernetes control plane to dynamically create one or more service mesh network resources for the custom resource object and configure the one or more service mesh network resources using the custom resource definitions; and
enabling communications from the consumer entity to access the service provided by the external entity by using the one or more service mesh network resources.

10. The method of claim 9, further comprising:
monitoring the custom resource object; and
performing one or more actions relating to the one or more service mesh network resources in response to a change of the custom resource object, wherein the change includes one or more of a creation, a modification, or a deletion.

11. The method of claim 10, further comprising:
deleting the one or more service mesh network resources for the custom resource object in response to the deletion of the custom resource object,
wherein the communications between the consumer entity and the external entity are not enabled in response to the one or more service mesh network resources being deleted.

12. The method of claim 9, further comprising:
updating the record in a data store for the service with the custom resource object; and
increasing a reference count for the custom resource object by one, wherein the reference count is used to identify the association with the consumer entity using the service.

13. The method of claim 12, further comprising:
receiving a second request from a second consumer entity to register with the service provided by the external entity;
determining that the record for the service exists in the data store; and
increasing the reference count for the custom resource object in the data store by one and updating the association to the service to include the second consumer entity.

14. The method of claim 13, further comprising:
enabling the second consumer entity access to the service by using the one or more service mesh network resources for the custom resource object for the service.

15. The method of claim 9, wherein the service mesh network resources include one or more of service entries, virtual services, destination rules, route rules, gateways, or quotas.

16. The method of claim 9, wherein the custom resource definitions are created specifically for the service.

17. A computer-readable medium storing instructions executable by a computer device, comprising:
at least one instruction for causing the computer device to receive a request, at a service mesh network, from a consumer entity to register with an external entity that provides a service, wherein the service is discovered by the consumer entity using a network repository function in a 5G network, and wherein the service is unknown to the service mesh network prior to receiving the request from the consumer entity;
at least one instruction for causing the computer device to create a record in a datastore for the service to maintain an association of the consumer entity using the service;
at least one instruction for causing the computer device to create, in response to receiving the request from the consumer entity, a custom resource object for the service provided by the external entity, wherein the custom resource object includes custom resource definitions that define characteristics of the service and routing requirements for communications with the service;
at least one instruction for causing the computer device to provide the custom resource object to a Kubernetes control plane that manages network resources of the service mesh network and instruct the Kubernetes control plane to dynamically create one or more service mesh network resources for the custom resource object and configure the one or more service mesh network resources using the custom resource definitions; and
at least one instruction for causing the computer device to enable communications from the consumer entity to access the service provided by the external entity using the one or more service mesh network resources.

18. The computer-readable medium of claim 17, further comprising:
at least one instruction for causing the computer device to monitor the custom resource object; and
at least one instruction for causing the computer device to perform one or more actions relating to the one or more service mesh network resources in response to a change of the custom resource object, wherein the change includes one or more of a creation, a modification, or a deletion.

* * * * *